(12) United States Patent
Raum (10) Patent No.: US 7,357,051 B2
(45) Date of Patent: Apr. 15, 2008

(54) RATCHET-TYPE ADJUSTMENT DEVICE

(75) Inventor: Holger Raum, Sulzbach-Rosenberg (DE)

(73) Assignee: Grammer AG, Amberg (DE)

( * ) Notice: Subject to any disclaimer, the term of this patent is extended or adjusted under 35 U.S.C. 154(b) by 527 days.

(21) Appl. No.: 10/827,894

(22) Filed: Apr. 20, 2004

(65) Prior Publication Data
US 2004/0221679 A1 Nov. 11, 2004

(51) Int. Cl.
| | |
|---|---|
| *G05G 1/00* | (2006.01) |
| *F16M 13/00* | (2006.01) |
| *B60N 2/02* | (2006.01) |
| *A47C 7/54* | (2006.01) |

(52) U.S. Cl. ............ 74/535; 74/575; 74/577 R; 74/577 M; 74/578; 248/424; 297/353; 297/411.36

(58) Field of Classification Search ............ 74/526, 74/527, 535, 577 R, 577 M, 578; 248/424; 297/353, 411.36; 403/107; G05G 1/00; F16M 13/00
See application file for complete search history.

(56) References Cited

U.S. PATENT DOCUMENTS

| | | | | |
|---|---|---|---|---|
| 4,012,158 A | * | 3/1977 | Harper | 403/107 |
| 4,451,084 A | * | 5/1984 | Seeley | 297/353 |
| 4,639,039 A | * | 1/1987 | Donovan | 297/353 |
| 5,324,096 A | * | 6/1994 | Schultz | 297/411.36 |
| 5,586,809 A | * | 12/1996 | Szmadzinski | 297/353 |
| 5,664,842 A | * | 9/1997 | Tseng | 297/411.36 |
| 5,685,609 A | * | 11/1997 | Miotto | 297/353 |
| 5,695,249 A | * | 12/1997 | Lotfi | 297/353 |
| 6,276,757 B1 | * | 8/2001 | Brown | 297/353 |
| 6,517,041 B2 | * | 2/2003 | Raum | 248/424 |
| 6,533,355 B2 | * | 3/2003 | Broekhuis et al. | 297/353 |

FOREIGN PATENT DOCUMENTS

| | | |
|---|---|---|
| DE | 43 21 720 | 1/1995 |
| DE | 100 39 501 | 2/2002 |

* cited by examiner

*Primary Examiner*—Vinh T. Luong
(74) *Attorney, Agent, or Firm*—Needle & Rosenberg, P.C.

(57) ABSTRACT

A ratchet-type adjustment device for the ratcheting displacement of an adjustment body with respect to a fixed base element having an oblong actuating element, where the actuating element can be displaced along linear toothed portions, which are fitted to the adjustment body on either side of the actuating element, and latched into the first linear toothed portion, acting as driving toothed portion, by first ratchet elements, the adjustment device furthermore comprising at least two second ratchet elements mounted pivotably on the fixed base element, which ratchet elements can be latched into the second linear toothed portion, acting as blocking and braking toothed portion, to block a displacement movement of the adjustment body with respect to the fixed base element.

7 Claims, 10 Drawing Sheets

RATCHET-TYPE ADJUSTMENT DEVICE

CROSS-REFERENCE TO RELATED APPLICATION

This application claims the priority benefit of German Application No. DE 103 18 939.4 filed on Apr. 26, 2003 and German Application No. DE 10 2004 011 054.9 filed on Mar. 6, 2004, which are hereby incorporated by this reference in their entireties.

BACKGROUND OF THE INVENTION

Field of the Invention

The invention relates to a ratchet-type adjustment device for the ratcheting displacement of an adjustment body with respect to a fixed base element by means of an oblong actuating element, with linear toothed portions which are fitted to the adjustment body on either side of the actuating element, according to the preamble of Patent claim 1.

Such linear ratchet-type adjustment devices are used for example in vehicle seats to move a seating surface of the vehicle seat forwards or backwards as desired with respect to a basic frame. Such adjustment devices for the step-wise ratcheting adjustment of an adjustment body by means of an oblong actuating element are also used to carry out a height adjustment of the seating surface.

DE 100 39 501 A1 discloses a ratchet-type adjustment device which has an adjustment body that can be displaced with respect to a fixed base element, such as for example the basic frame of a seating surface, said adjustment body being connected to the seating surface. The adjustment body may be displaced with respect to the base element by means of an oblong plate-shaped actuating element at the end of which there is a handle, in that two ratchet elements engage in a linear toothed portion of the adjustment body, said ratchet elements being mounted pivotably on the actuating element at an axial distance from one another and enclosing an angle with one another.

By virtue of the engaging or latching of the ratchet elements into the linear toothed portion, the adjustment body is moved along with the actuating element when the latter is displaced.

In order to achieve the ratchet effect, the actuating element may be moved back again with respect to the adjustment body by the ratchet element directed against this displacement movement being unlatched from the linear toothed portion by means of an unlatching member that is fixed to the base element. In this case, the ratchet element acting against a forward displacement movement of the actuating element is arranged, by virtue of the angle setting, such that it scrapes backwards over teeth of the linear toothed portion.

In such an adjustment device, in each case two ratchet elements are mounted pivotably in the actuating element in the region of first and second longitudinal sides of the actuating element. Although, depending on the displacement position of the actuating element and of the associated ratchet elements with respect to the linear toothed portions arranged on either side of the actuating element, the actuating element is thereby arrested with respect to the adjustment body, there is no arresting mechanism for arresting the adjustment body or actuating element with respect to the fixed base element. Consequently, there is a risk of undesired displacement of the adjustment body with respect to the fixed base element.

The two ratchet elements assigned to each linear toothed portion have at their end sides, like the teeth of the linear toothed portion, relatively small tooth sizes, the teeth of the ratchet elements engaging in the zig-zag-shaped linear toothed portion at a relatively steep angle within a very short time after the unlatching member has passed. This may lead to premature wear of the teeth both of the linear toothed portion and of the ratchet elements, since high adjustment forces are used to displace the adjustment body.

Furthermore, in such an adjustment device there is no stop to end the forward displacement movement of the actuating element with the adjustment body. This allows an uncontrolled displacement movement of the adjustment body with respect to the fixed base element.

SUMMARY OF THE INVENTION

Accordingly, it is an object of the present invention to provide a ratchet-type adjustment device for the ratcheting displacement of an adjustment body with respect to a fixed base element by means of an oblong actuating element, in which the displacement movements of the adjustment body with respect to the fixed base element and of the actuating element with respect to the adjustment body can be better controlled.

This object is achieved according to the features of Patent claim 1.

An essential point of the invention is that in a ratchet-type adjustment device in which an oblong actuating element can be displaced along linear toothed portions fitted to an adjustment body on either side, the actuating element can be latched into a first linear toothed portion by means of first ratchet elements and two second ratchet elements are mounted on a fixed base element, which second ratchet elements are used to block a displacement movement of the adjustment body with respect to the fixed base element and can be latched into the second linear toothed portion. In this case, the first linear toothed portion acts as driving toothed portion for driving the adjustment body by means of the actuating element and the second linear toothed portion acts as blocking and braking toothed portion for braking or blocking the displacement movement of the actuating element and of the adjustment body with respect to the fixed base element. By virtue of the connection of the second ratchet elements to the base element by means of pivot bearings, a ratchet connection is provided between the base element and the adjustment body, said ratchet connection resulting in it being possible for an undesired displacement of the adjustment body with respect to the base element to be avoided.

The linear toothed portions at the same time serve as guides for the displaceable actuating element, with the adjustment body and the oblong actuating element being plate-shaped. These may be sheet steel parts. The linear toothed portions fitted to the adjustment body have, together with the oblong actuating element and the ratchet elements, with the exception of the pivot bearings of the latter, the same thickness. They are arranged next to one another on the adjustment body so that a small overall thickness of the adjustment device according to the invention is achieved. In this way, the adjustment device can be installed in a vehicle seat in an advantageously space-saving manner.

By means of the adjustment device according to the invention, a linear step-wise ratcheting adjustment of the adjustment body with respect to the fixed base element is possible, as a result of which a rapid and time-saving adjustment of the vehicle seat is possible.

Each second ratchet element can be pivotably unlatched from the linear toothed portion by means of at least one protrusion formed along a longitudinal side of the actuating element, by displacing the actuating element, so that a controlled latching and unlatching of the second ratchet elements is possible by virtue of the displacement movement of the actuating element. When setting the second ratchet elements arranged at a distance from one another with in each case an acute angle to the running direction of the second linear toothed portion, a suitable arrangement of the protrusions along the longitudinal side of the actuating element means that one of the ratchet elements can be unlatched in order thus to allow the displacement movement in a predefined direction.

For this purpose, the ratchet elements are arranged opposite one another at an angle such that one ratchet element blocks or brakes a forward displacement movement and the second ratchet element blocks or brakes a backward displacement movement of the adjustment body. In this way, automatic enabling of the displacement movement of the adjustment body with respect to the fixed base element by displacing the actuating element is achieved.

The teeth of the second linear toothed portion are designed such that their sloping flanks allow end sides of the second ratchet elements to obliquely press against them. This allows the use of relatively large teeth, as a result of which premature wear of the teeth is avoided.

According to one preferred embodiment, the second ratchet elements are pressed against the second linear toothed portion, under the effect of spring force, by means of at least one tension spring which connects the ratchet elements, and said second ratchet elements are designed such that their end pieces can be deflected by the protrusions counter to the effect of spring force in order to move the ratchet elements away from the linear toothed portion.

According to one preferred embodiment, the first ratchet elements are mounted in the actuating element such that they can pivot about an imaginary pivot axis oriented perpendicular to the displacement movement. By way of example, this can be achieved by the arrangement of two circular cut-outs at a distance from one another on a further longitudinal side of the actuating element, where in each case a ratchet element with a circular bearing section is mounted in the circular cut-outs in a manner such that it can be moved in a pivoting manner. Thus, a space-saving mounting of the first ratchet elements with respect to the overall thickness of the adjustment device is achieved in a simple manner.

The fixed base element has recesses to which pins are assigned which in turn are arranged on the first ratchet elements. The recesses serve to control the first ratchet elements, by means of the pins which are oriented orthogonally with respect to the displacement direction, in their pivoting movement as a function of the displacement position of the actuating element with respect to the adjustment body and as a function of the displacement direction of the actuating element. For this purpose, the recesses in each case have an edge profile such that an unlatching pivoting movement of one ratchet element and a latching pivoting movement of the other ratchet element is achieved by means of the pin sliding along the edges during the displacement of the actuating element. Consequently, only that ratchet element which is responsible for the adjustment body being moved along with the actuating element in a predefined direction is in the latched state.

As soon as the pins have arrived at the end of the recesses during a forward displacement movement of the actuating element, the end of the recesses acts as a stop to terminate the forward displacement movement of the actuating element. A backward displacement movement of the actuating element then takes place, leading to the other first ratchet element latching into the first linear toothed portion after a predefined return path on account of the end profile of the recesses. In this way, an additional blocking action in relation to any displacement of the actuating element with respect to the adjustment body can be achieved by means of the first ratchet elements, which are now both in the latched state.

According to one preferred embodiment, the first linear toothed portion is designed such that it has at its ends end teeth, preferably in each case one end tooth, the length dimensions of which, with respect to the displacement direction, are greater than the length dimensions of the remaining teeth of the first linear toothed portion. These length dimensions of the end teeth may for example be twice the length dimension of the remaining teeth. In this way, automatic end stop termination of the overall ratchet-type adjustment device is provided in that the first or second ratchet element acting as drive is brought out of engagement, that is to say is no longer engaging with its teeth in the teeth of the first linear toothed portion. This results in it not being possible for the adjustment body to be moved any further.

Further advantageous embodiments are contained in the dependent claims.

DESCRIPTION OF THE DRAWINGS

Advantages and expediency can be found in the following description in conjunction with the drawing, in which.

DETAILED DESCRIPTIONS OF THE DRAWINGS

Figure 1:
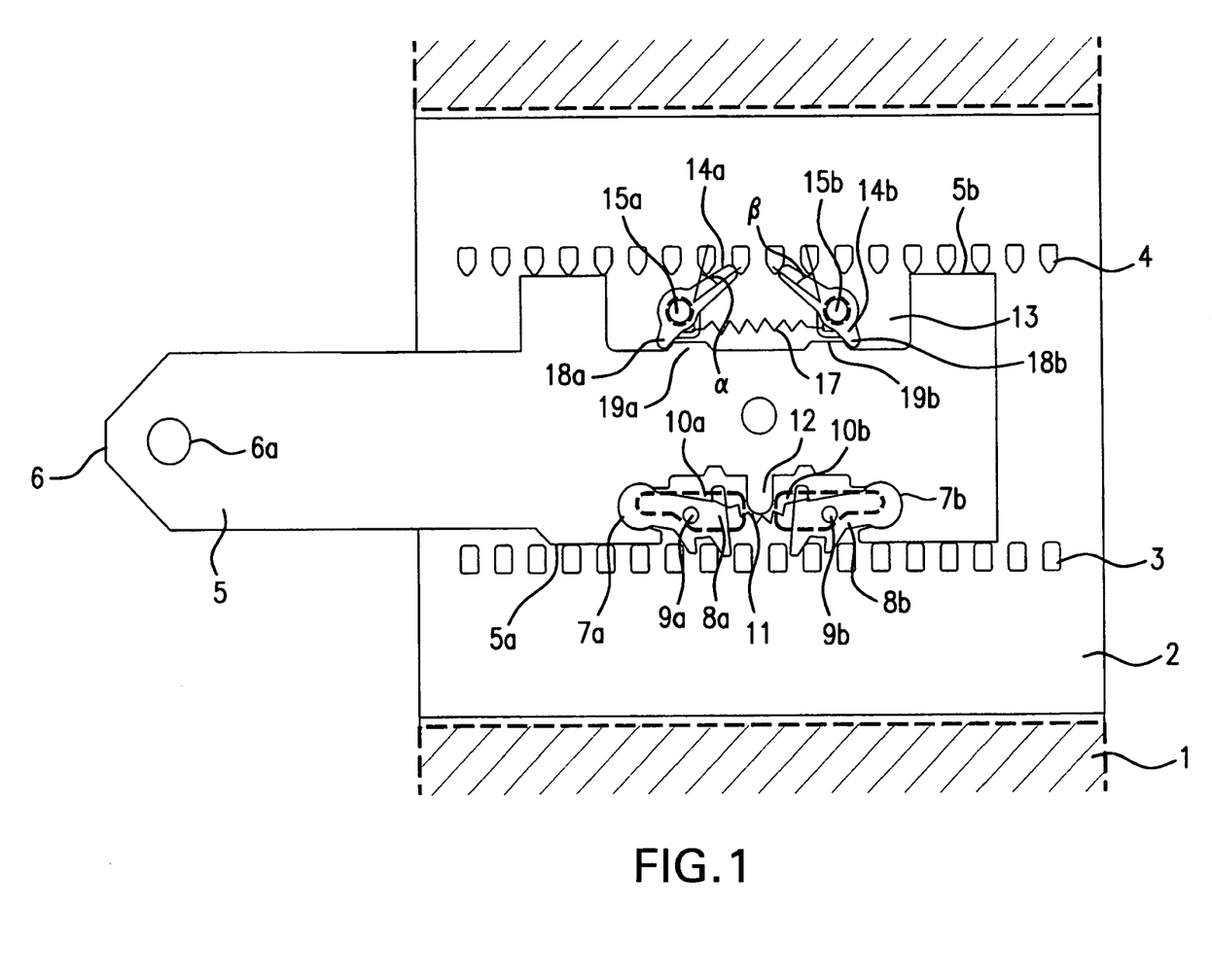
FIG. 1 shows a plan view of a first embodiment of the adjustment device according to the invention with an adjustment body that has not been displaced.

FIG. 1 shows a plan view of a first embodiment of the ratchet-type adjustment device for the ratcheting displacement of an adjustment body with respect to a fixed base element by means of an oblong actuating element, with the adjustment body in the central position—that is to say a zero position—in which the adjustment body has not been displaced with respect to the base element. The ratchet-type adjustment device according to the invention comprises the adjustment body 2 which is arranged such that it can be displaced in the fixed base element 1, said adjustment body having on its surface a first linear toothed portion 3 and a second linear toothed portion 4 running parallel thereto.

Both the base element 1 and the adjustment body 2 and an actuating element 5 are plate-shaped, that is to say they have a small thickness.

The actuating element 5 is arranged between the first and second linear toothed portions 3, 4 such that it can be displaced, the row arrangement of the individual teeth of the linear toothed portions acting as guides for first and second longitudinal sides 5a, 5b of the actuating element 5.

Since the linear toothed portions 3, 4 and the actuating element 5 have essentially the same thickness, the overall construction can be covered at the top by means of a cover plate (not shown here) in order to prevent the adjustment device from becoming dirty and being affected in terms of its operation by other objects.

The actuating element 5 may have, at its open end 6, a handle 6b (shown in FIG. 2) of common design, connected to element 5 through an opening 6a, which is used to move the actuating element 5 back and forth or forwards and backwards in order to obtain a linear step-wise ratcheting adjustment of the adjustment body 2 relative to the fixed base element 1.

The actuating element 5 has, on its first longitudinal side 5a, circular cut-outs 7a, 7b which are spaced apart from one another and are used for the bearing reception of a circular bearing section of first ratchet elements 8a, 8b. In this way, there is a pivotable mounting of the first ratchet elements 8a, 8b within the actuating element 5.

The ratchet elements 8a, 8b have pins 9a, 9b at the top, which pins extend perpendicular to the displacement movement of the actuating element which is directed to the left and to the right with respect to the plane of the drawing in FIG. 1. The pins 9a, 9b engage in recesses 10a, 10b which are arranged within the fixed base element, the latter extending in this region over the first ratchet elements in a manner not shown here.

The recesses 10a, 10b serve to guide the pins 9a, 9b and trigger, as a function of their specific edge profile, predefined pivoting movements of the first ratchet elements 8a, 8b by the pins 9a, 9b sliding along the edge of the recesses 10a, 10b.

In order to ensure a sustained latching of the first ratchet elements 8a, 8b in the teeth of the first linear toothed portion 3, the first ratchet elements are subjected to spring force by means of a tension spring 11. The spring force of the tension spring 11 presses the ratchet elements 8a, 8b against the teeth of the first linear toothed portion 3 and acts against a pivoting movement that can be carried out to unlatch the ratchet elements 8a, 8b, in that the tension spring is deflected over a protrusion 12 which is arranged in the region of the first longitudinal side 5a of the actuating element 5.

In a recess 13 along the second longitudinal side 5b of the actuating element 5 there are arranged two second ratchet elements 14a, 14b which are pressed against the linear toothed portion 4 acting as braking and blocking toothed portion. The second ratchet elements 14a, 14b act as brakes and are mounted pivotably, by means of pins 15a, 15b projecting out of the plane of the drawing, on the fixed base element 1 which in this region extends over the brakes 14a, 14b, although this is not shown in this figure.

Advantageously, the brakes 14a, 14b are placed at an acute angles α and β respectively, with respect to the linear toothed portion such that one brake 14a can act against a forward displacement movement and the other brake 14b can act against a backward displacement movement.

In order to ensure that the brakes 14a, 14b latch into the second linear toothed portion 4, the two brakes are subjected to spring force by means of a tension spring 17.

FIG. 1 shows the ratchet elements 14a, 14b both in a fully latched position.

By displacing the actuating element 5 it is possible to deflect, in a predefined manner, rear end pieces 18a, 18b of the brakes 14a, 14b by means of protrusions 19a, 19b arranged within the recess 13 and as a result bring about unlatching of the brakes. This leads to a release of the arresting that exists between the actuating element 5 and the adjustment body 2, in one of the two displacement directions.

FIG. 2 again shows the adjustment device in order to illustrate the design of the adjustment device according to the invention in a spatial exploded view without showing the fixed base element. As can be seen in the drawing of the adjustment device shown in FIG. 2, both the adjustment body 2 and the actuating element 5 and the first and second ratchet elements 8a, 8b, 14a, 14b have a small thickness so that the overall thickness of the adjustment device according to the invention is small.

Figure 2:
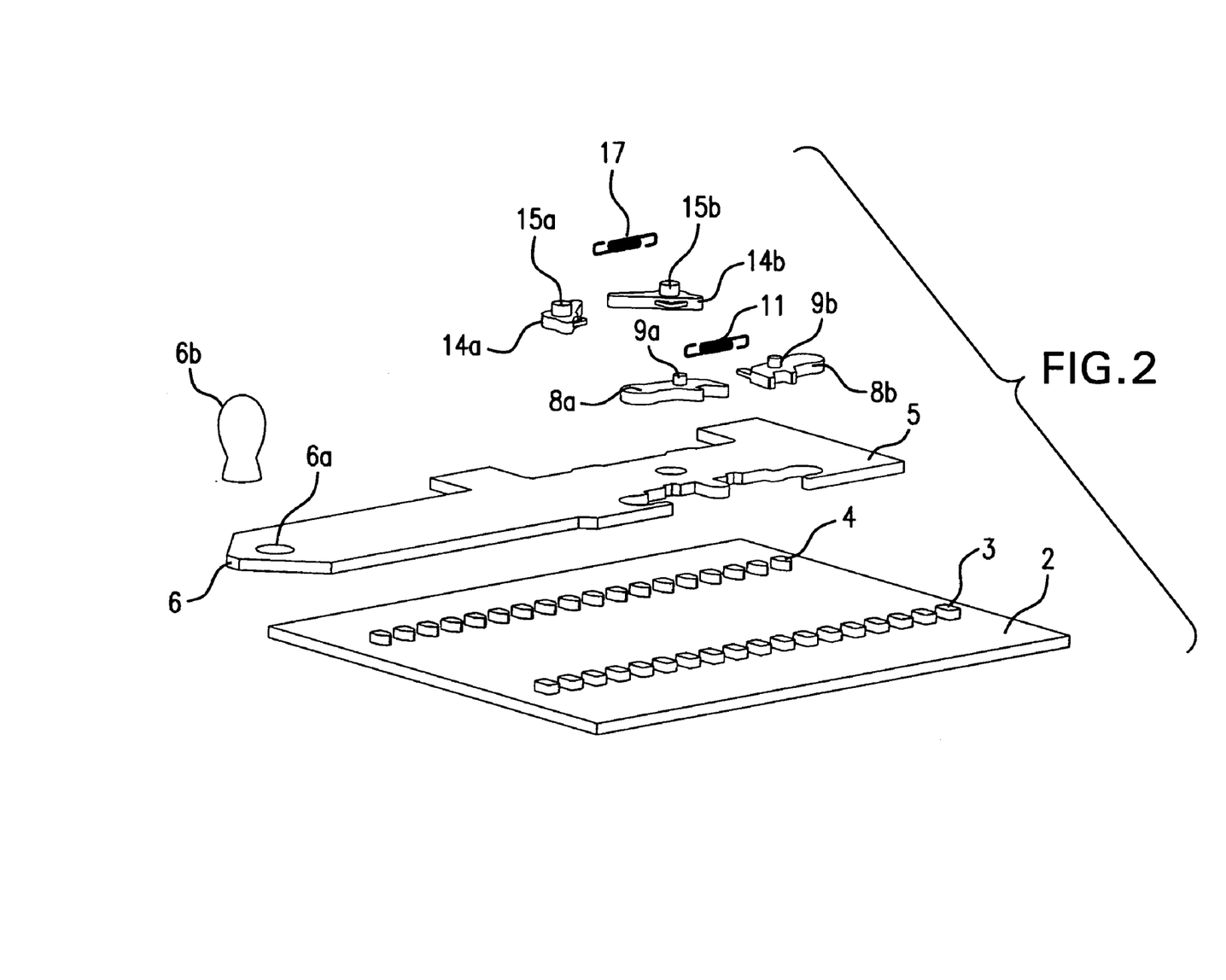
FIG. 2 shows a spatial exploded view of the first embodiment of the adjustment device according to the invention with associated essential parts.

In this case, the actuating element 5 and the first and second ratchet elements 8a, 8b, 14a, 14b have the same thickness.

The drawing shown in FIG. 2 clearly shows that the ratchet elements have pins 9a, 9b, 15a, 15b at the top, said pins being used to guide the first ratchet elements 8a, 8b within the recesses 10a, 10b and to pivotably mount the brakes 14a, 14b within the fixed base element 1.

Figure 3:
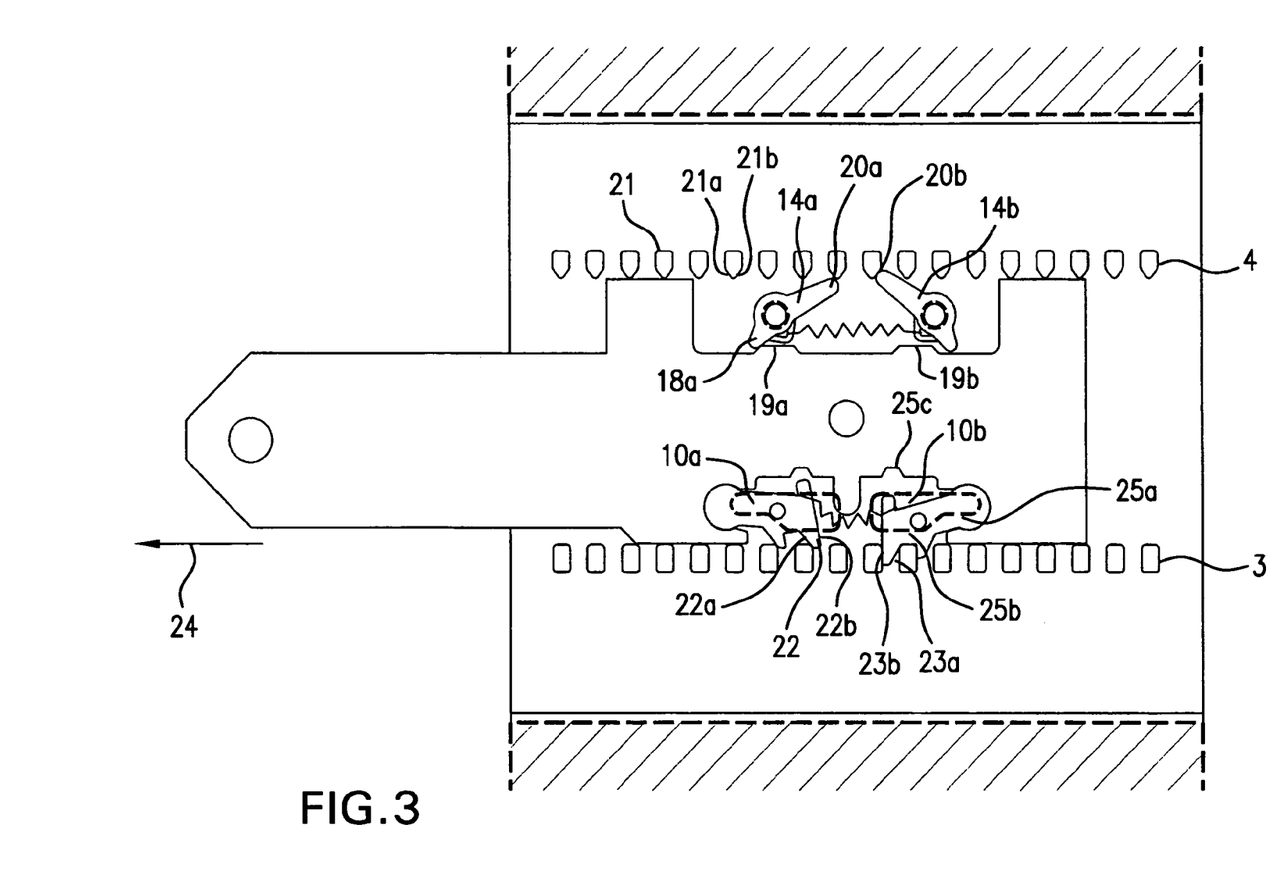
FIG. 3 shows a plan view of the first embodiment of the adjustment device according to the invention at the start of a displacement movement of the actuating element.

FIG. 3 shows the adjustment device according to the invention at the start of a forward adjustment operation. For this purpose, the actuating element 5 is displaced by 2 mm to the left. The displacement of the actuating element with respect to the adjustment body 2 is indicated by arrow 24.

In this way, prior to the start of the displacement of the adjustment body 2 there is a complete latching of the first ratchet element 8b in the first linear toothed portion 3, which serves as driving toothed portion. Both this complete latching of the first ratchet element 8b and an unlatching of the first ratchet element 8a are determined by the course of the pins 9a, 9b along the edge 25 of the recesses 10b, 10a.

On account of the displacement of the actuating element 5, the rear end 18a is pivoted by the protrusion 19a, as a result of which an end side 20a of the brake 14a is moved away from the teeth 21 of the braking toothed portion 4. However, an end side 20b of the brake 14b remains in contact with the teeth 21.

By virtue of the unlatching pivoting movement of the brake 14a, a displacement of the adjustment body 2 to the left in relation to the plane of the drawing with respect to the base element 1 becomes possible for the first time, since previously the brake 14a connected to the base element brought about an arresting of the adjustment body 2 with respect to the base element 1.

Figure 4:
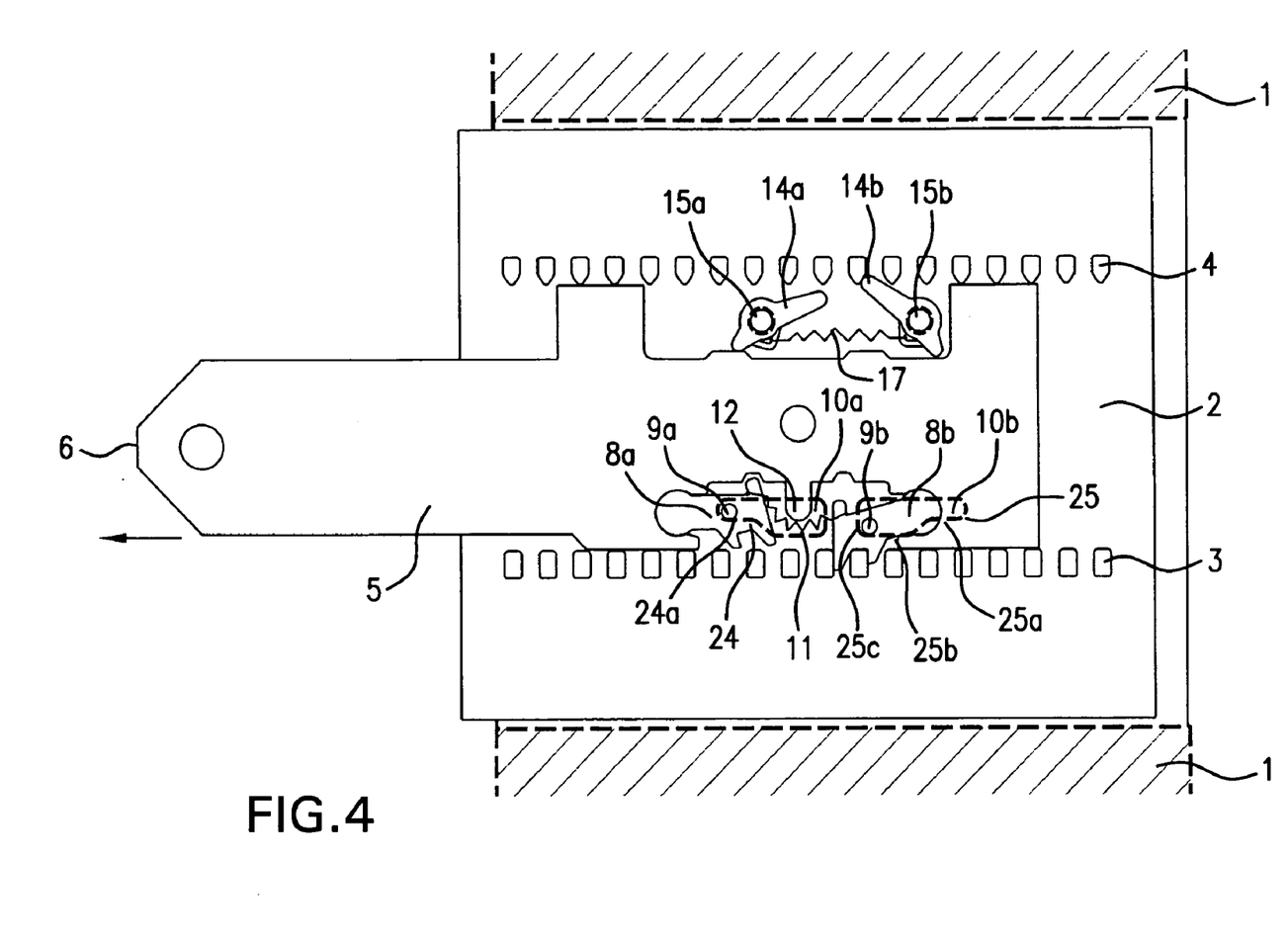
FIG. 4 shows a plan view of the first embodiment of the adjustment device according to the invention with an adjustment body that has been displaced during a forward displacement movement.

FIG. 4 shows a plan view of the adjustment device according to the invention at the end of the forward adjustment or displacement operation. The actuating element 5 has now been displaced for example by a total of 10 mm to the left, whereas the slide-type adjustment body 2 has undergone a displacement to the left or a forward displacement of 8 mm for example.

The difference in the two displacement movements of the order of about 2 mm arises on account of the initial displacement of the actuating element 5 with respect to the adjustment body 2, as shown in FIG. 3. This initial displacement of the actuating element 5 by for example 2 mm serves for the sliding latching and unlatching of the first ratchet elements 8a, 8b and for the unlatching of the brake 14a. Such a sliding latching and unlatching operation is gentle on the individual teeth 22 of the ratchet elements and the individual driving teeth of the first linear toothed portion 3 during interaction of said teeth.

FIG. 4 shows the ratchet element 14a in an unlatched position and ratchet element 14b in a latched position, such that movement in the left direction is prevented.

Moreover, a sliding latching and unlatching is required by a tooth profile of the teeth 22 of the first ratchet element, which tooth profile is remarkable in that the teeth have on one side a sloping flank 22a and on the other side a flank 22b that is oriented perpendicular to the displacement movement of the actuating element.

For the displacement movement of the actuating element 5 in the opposite direction, on the other first ratchet element 8b the flanks are arranged in reverse order, as indicated by references 23a and 23b.

The end of the forward displacement operation is determined by the pin 9b which slides along an edge 25 of the recess 10b from the section 25a over the section 25b to the section 25c. The section 25c serves as a stop for the pin 9b and prevents any further forward displacement of the adjustment body 2 and of the actuating element 5 with respect to the fixed base element 1, since the recess 10b is arranged within the fixed base element.

At the same time, an unlatching pivoting movement of the first ratchet element 8a takes place by guiding the pin 9a within the edge section 24a of the edge 24 of the recess 10a.

Figure 5:
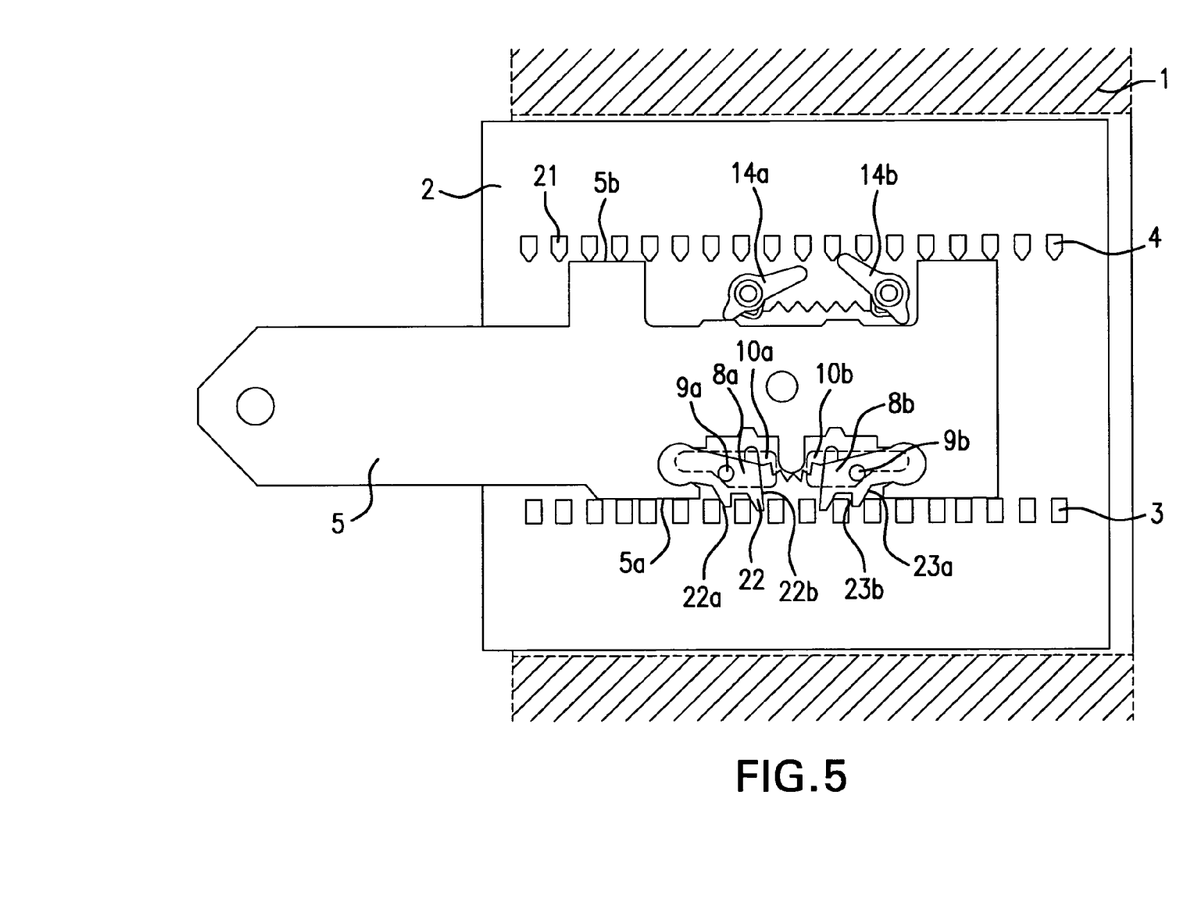
FIG. 5 shows a plan view of the first embodiment of the adjustment device according to the invention with an adjustment body that has been displaced, at the time of a backward displacement movement of the actuating element.

If, then, the actuating element 5 as shown in the drawing in FIG. 5 is pushed back, that is to say is displaced to the right in relation to the plane of the drawing, a relative displacement of the actuating element 5 with respect to the adjustment body 2 takes place since a carrying along of the adjustment body 2 by the actuating element is not possible on account of the unlatched position of the first ratchet element 8a. Consequently, the actuating element 5 can be displaced to the right with respect to the adjustment body 2 by a total of 10 mm.

FIG. 5 shows a plan view of the adjustment device according to the invention with an actuating element 5 that has been moved back. The actuating element 5 once again assumes a zero position with respect to the fixed base element and by displacing the protrusion 19a brings about a latching of the brake 14a, which leads to a blocked position of the adjustment body 2 with respect to the fixed base element 1.

Likewise, the first ratchet elements 8a, 8b are in turn in the not completely latched position on account of the effect of the spring 11.

In this zero position, for example, the vehicle seat, the seating surface of which is connected to the adjustment body 2, can be used without it being possible for an undesired displacement of the seating surface with respect to the fixed base element to take place. Alternatively, by means of a forward displacement movement of the actuating element 5, a further adjustment cycle can be started to displace the seating surface together with the adjustment body 2 even further.

Figure 6:
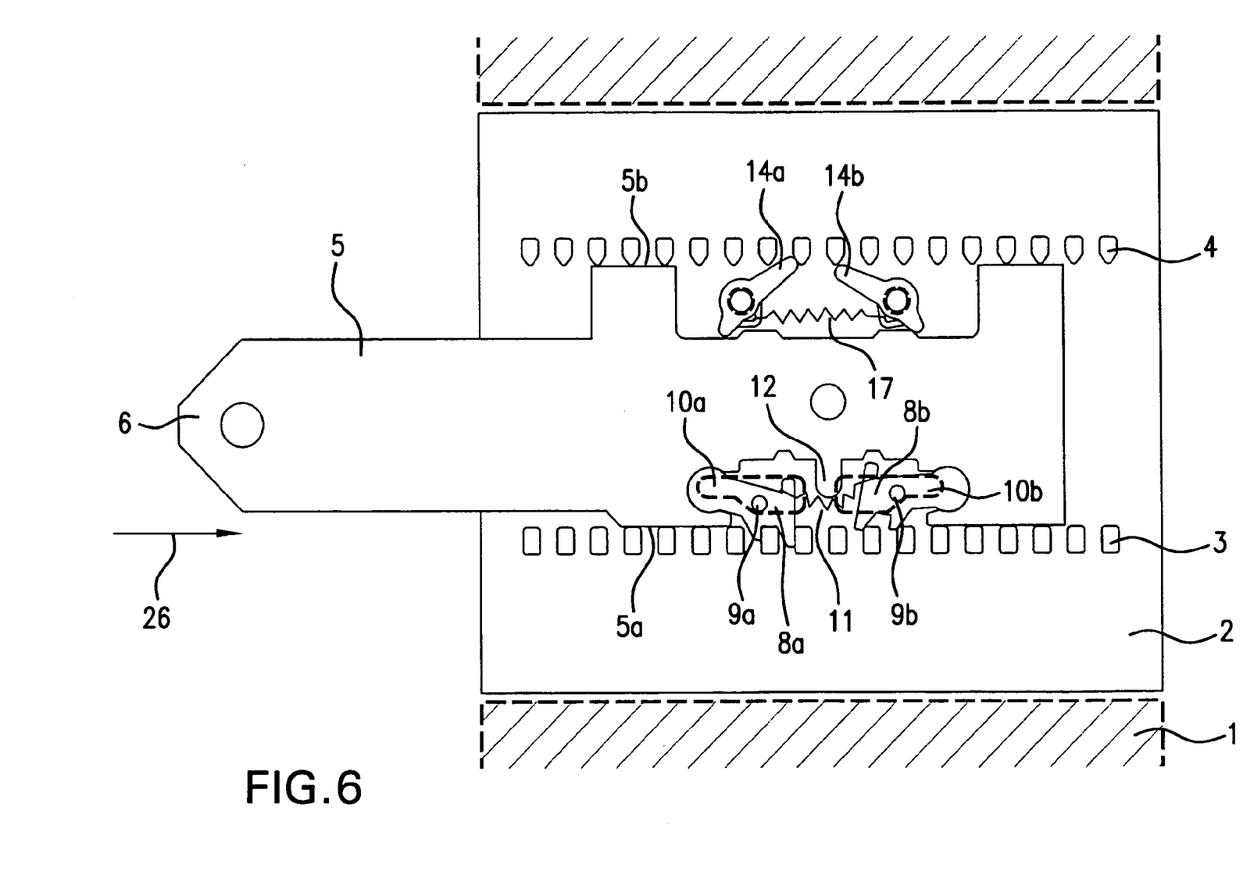
FIG. 6 shows a plan view of the first embodiment of the adjustment device according to the invention at the start of a displacement movement of the actuating element to trigger a backward displacement movement of the adjustment body.

FIG. 6 shows a plan view of the adjustment device according to the invention at the start of a backward adjustment operation, that is to say a displacement of the adjustment body 2 in the opposite direction. For this purpose, the actuating element 5, as indicated by arrow 26, is displaced by 2 mm to the right in relation to the plane of the drawing, whereupon the brake 14b unlatches on account of the movement of the protrusion 19b.

The first ratchet element 8b likewise unlatches from the linear toothed portion 3 on account of the guiding of its pin 9b along the edge sections 25a and 25b. At the same time, the first ratchet element 8a latches into the linear toothed portion 3 on account of the guiding of its pin 9a along the edge section 25b.

Figure 7:
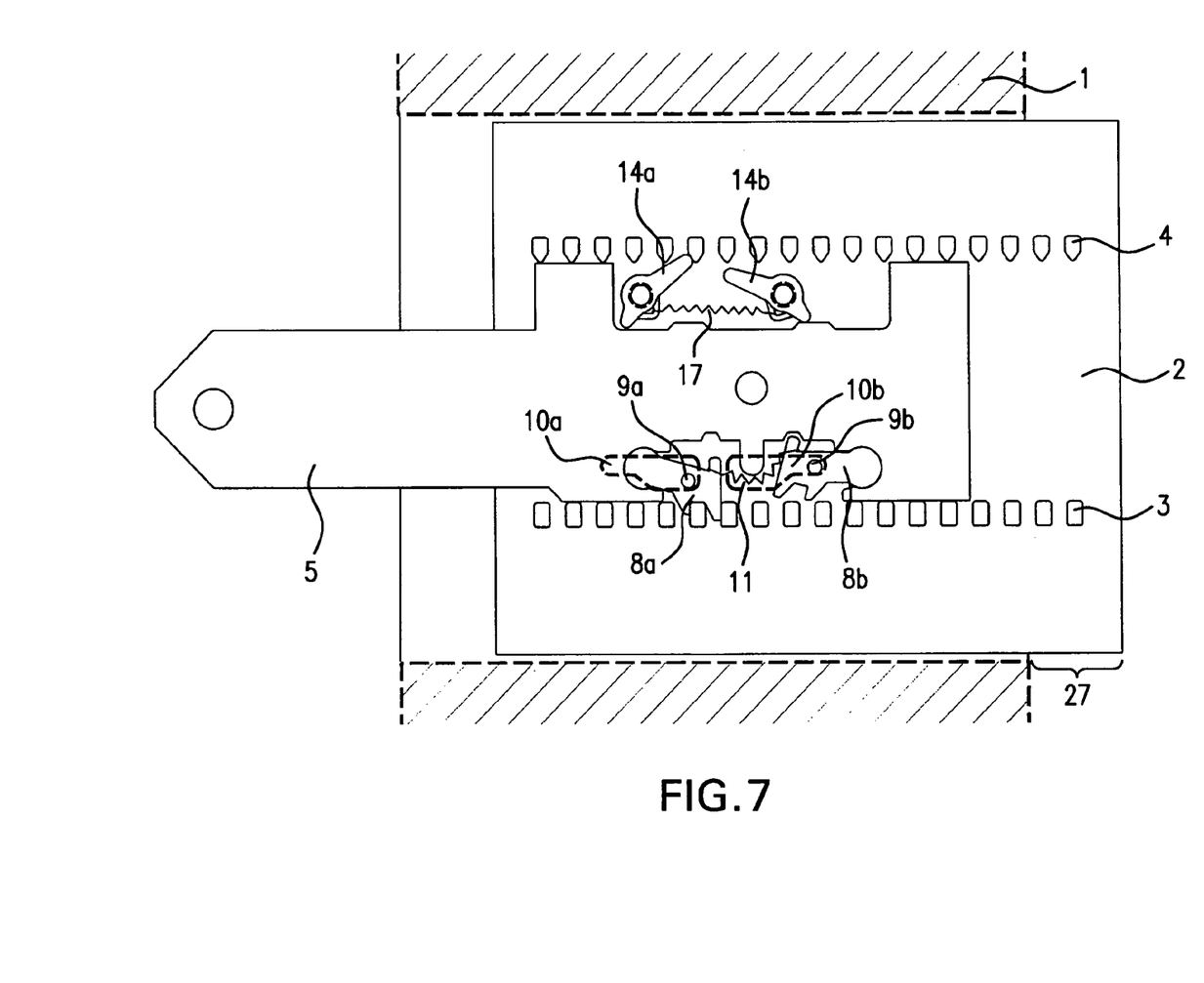
FIG. 7 shows a plan view of the first embodiment of the adjustment device according to the invention with the adjustment body displaced in the opposite direction.

FIG. 7 shows a plan view of the adjustment device according to the invention after termination of a backward displacement operation, where in this case a total of three displacement or adjustment cycles have been carried out with forward displacement of the actuating element 5 therebetween. This corresponds to a displacement of the adjustment body 2 by a total of 24 mm, as shown by reference 27.

FIGS. 5, 6 and 7 show the ratchet element 14a in a latched position, such that movement in the rightward direction is prevented, and ratchet element 14b in an unlatched position.

Figure 8:
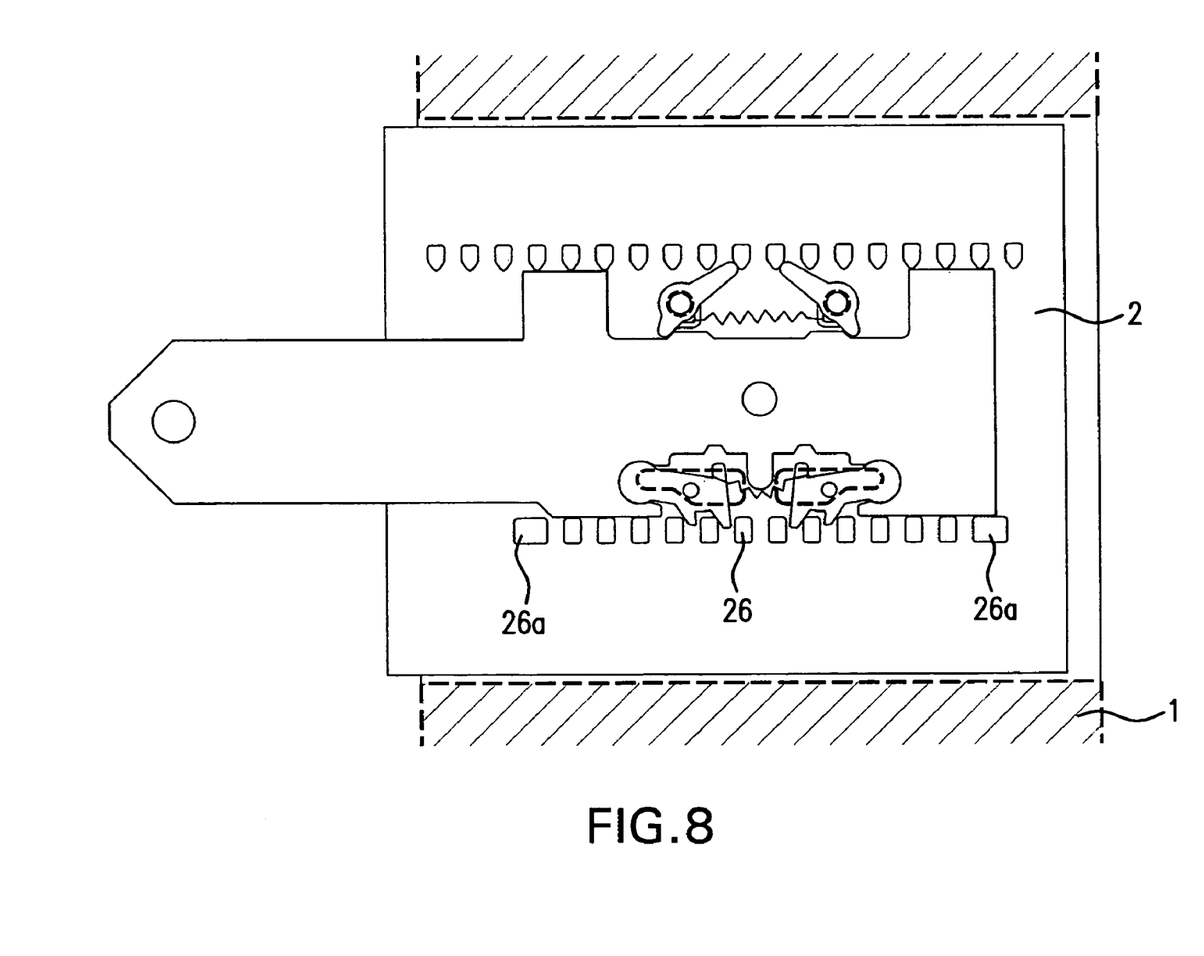
FIG. 8 shows a plan view of a second embodiment of the adjustment device according to the invention with an adjustment body that has not been displaced.
Figure 9:
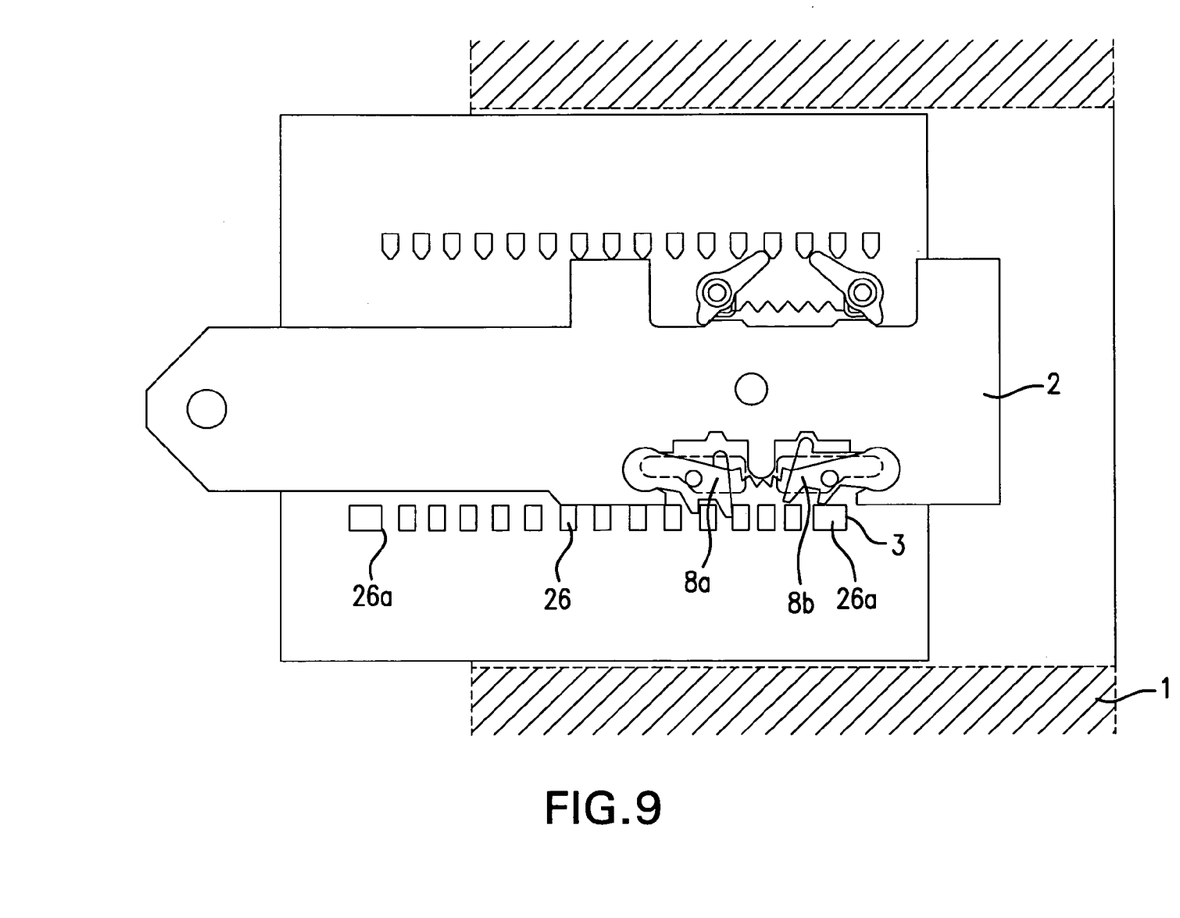
FIG. 9 shows a plan view of the second embodiment of the adjustment device according to the invention with a displaced adjustment body in a first end position.
Figure 10:
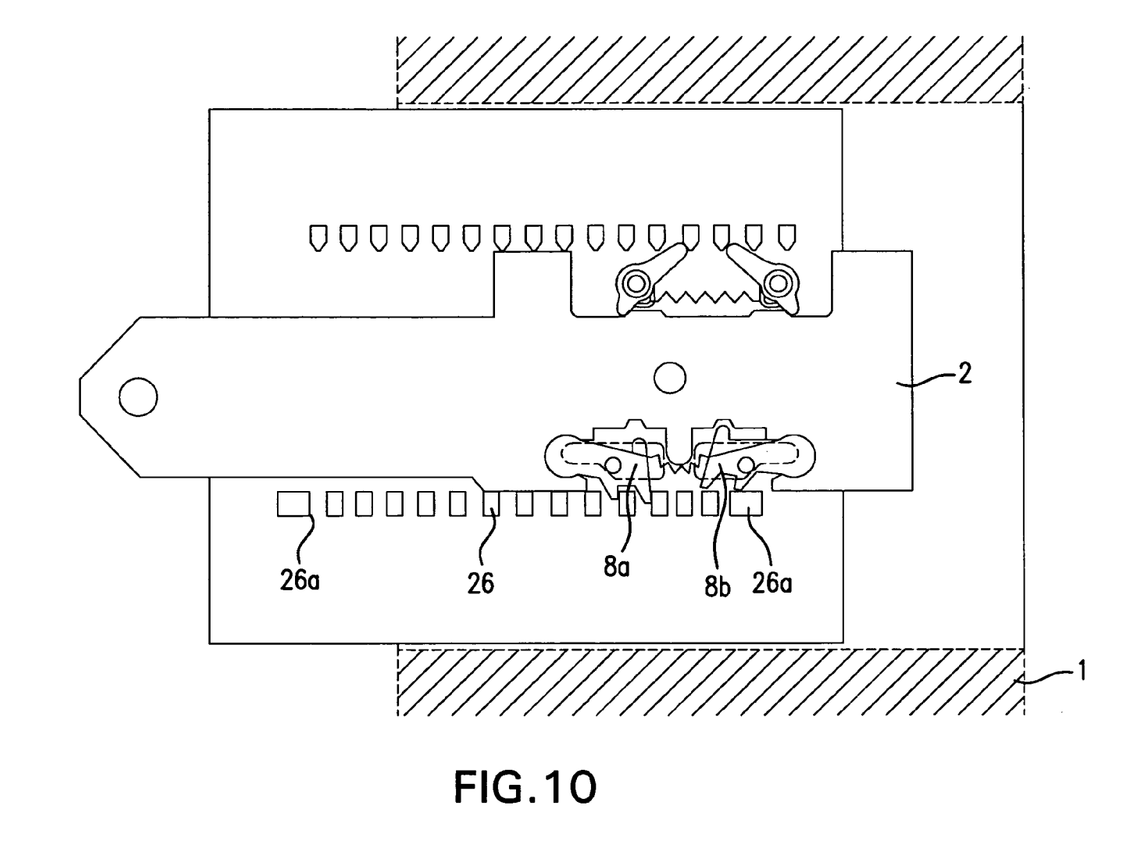
FIG. 10 shows a plan view of the second embodiment of the adjustment device according to the invention with a displaced adjustment body in a second end position.

FIGS. 8 to 10 show a second embodiment of the displacement device according to the invention. The second embodiment differs from the first embodiment in that end teeth 26a are formed at ends of the first linear toothed portion 3 such that their length dimensions, with respect to the displacement direction, are twice as large as the length dimensions of the remaining teeth 26 arranged between the end teeth 26a. In this way, as soon as the adjustment body is in a predefined end position, as shown in FIGS. 9 and 10 for a forward and backward displacement, the first ratchet element 8a, 8b acting as drive is brought completely out of engagement with respect to the linear toothed portion 3. The consequence of this is that no further driving of the adjustment body 2 can take place. The slide-type adjustment body 2 thus cannot be moved any further. Such an automatic blocking of the entire adjustment device prevents, in a simple manner, undesirable excess displacement of the adjustment body 2 with respect to the fixed base element 1.

FIGS. 8, 9 and 10 show the ratchet elements 14a, 14b both in a fully latched position, to prevent movement in either direction.

In the figures, the same references have been used for identical and functionally identical parts.

All components are to be regarded as essential to the invention individually and in combination. Modifications thereof are known to the person skilled in the art. By way of example, the oblong actuating element may be designed as a leaf spring steel, the first ratchet elements and preferably also the second ratchet elements being arranged as resilient arms on both longitudinal sides of the actuating element and likewise being made of leaf spring steel. The ratchet elements and the actuating element are made as one piece. By displacing the ratchet elements, designed in the manner of leaf springs, together with the actuating element over a protrusion that is connected to the fixed base element, said protrusion being arranged in each case between the ratchet elements and the linear toothed portions, the ratchet elements which in their rest position engage in the linear toothed portion can be brought individually out of the engaged position into a disengaged position. In this way, the optional disengaging of the ratchet elements, which are directed either forwards or backwards with respect to the displacement movement of the actuating element, or the joint engaging of all ratchet elements is possible. The linear toothed portion is once again arranged on the adjustment body.

The invention claimed is:

1. A ratchet-type adjustment device for the ratcheting displacement of an adjustment body with respect to a fixed base element by means of an oblong actuating element, where the actuating element has the characteristic that said actuating element may be adjustably displaced along first and second linear toothed portions, which are fitted to the adjustment body on either side of the actuating element, and latched into the first linear toothed portion, acting as a driving toothed portion, by means of first ratchet elements, characterized by at least two second ratchet elements directly mounted pivotably on the fixed base element, the ratchet elements having latched and unlatched positions, which ratchet elements, when in the latched position, are latched into the second linear toothed portion, acting as a blocking and braking toothed portion, to block a displacement movement of the adjustment body with respect to the fixed base element;

wherein the fixed base element has recesses in which in each case a pin arranged on each first ratchet element is guided, the pins being oriented orthogonally with respect to the displacement direction of the actuating element.

2. The ratchet-type adjustment device according to claim 1, characterized in that the recesses in each case have an edge profile such that pivoting movements of the first ratchet elements are carried out by means of the pins sliding along the edges during the displacement movement of the actuating element.

3. The ratchet-type adjustment device according to claim 2, characterized in that the edge profile acts as a stop for the pins that move therein for the displacement movement of the actuating element with the adjustment body with respect to the fixed base element.

4. The ratchet-type adjustment device according to claim 1, characterized in that the first ratchet elements, in the latched position, are pressed against the first linear toothed portion, depending on the position of the pins within the recesses, by means of at least one tension spring deflected over a protrusion of the further longitudinal side of the actuating element.

5. A ratchet-type adjustment device for the ratcheting displacement of an adjustment body with respect to a fixed base element by means of an oblong actuating element, where the actuating element has the characteristic that said actuating element may be adjustably displaced along first and second linear toothed portions, which are fitted to the adjustment body on either side of the actuating element, and latched into the first linear toothed portion, acting as a driving toothed portion, by means of first ratchet elements, characterized by at least two second ratchet elements directly mounted pivotably on the fixed base element, the ratchet elements having latched and unlatched positions, which ratchet elements, when in the latched position, are latched into the second linear toothed portion, acting as a blocking and braking toothed portion, to block a displacement movement of the adjustment body with respect to the fixed base element;

wherein the tooth profile of the teeth of the first ratchet elements on one side has sloping flanks and on the other side has perpendicular flanks, with respect to the displacement direction.

6. A ratchet-type adjustment device for the ratcheting displacement of an adjustment body with respect to a fixed base element by means of an oblong actuating element, where the actuating element has the characteristic that said actuating element may be adjustably displaced along first and second linear toothed portions, which are fitted to the adjustment body on either side of the actuating element, and latched into the first linear toothed portion, acting as a driving toothed portion, by means of first ratchet elements, characterized by at least two second ratchet elements directly mounted pivotably on the fixed base element, the ratchet elements having latched and unlatched positions, which ratchet elements, when in the latched position, are latched into the second linear toothed portion, acting as a blocking and braking toothed portion, to block a displacement movement of the adjustment body with respect to the fixed base element;

wherein end teeth are arranged at ends of the first linear toothed portion, the length dimensions of which end teeth, with respect to the displacement direction, are greater than the length dimensions of the remaining teeth of the first linear toothed portion.

7. The ratchet-type adjustment device according to claim 6, characterized in that the length dimensions of the end teeth correspond to twice the length dimensions of the remaining teeth.

* * * * *